Patented Feb. 14, 1950

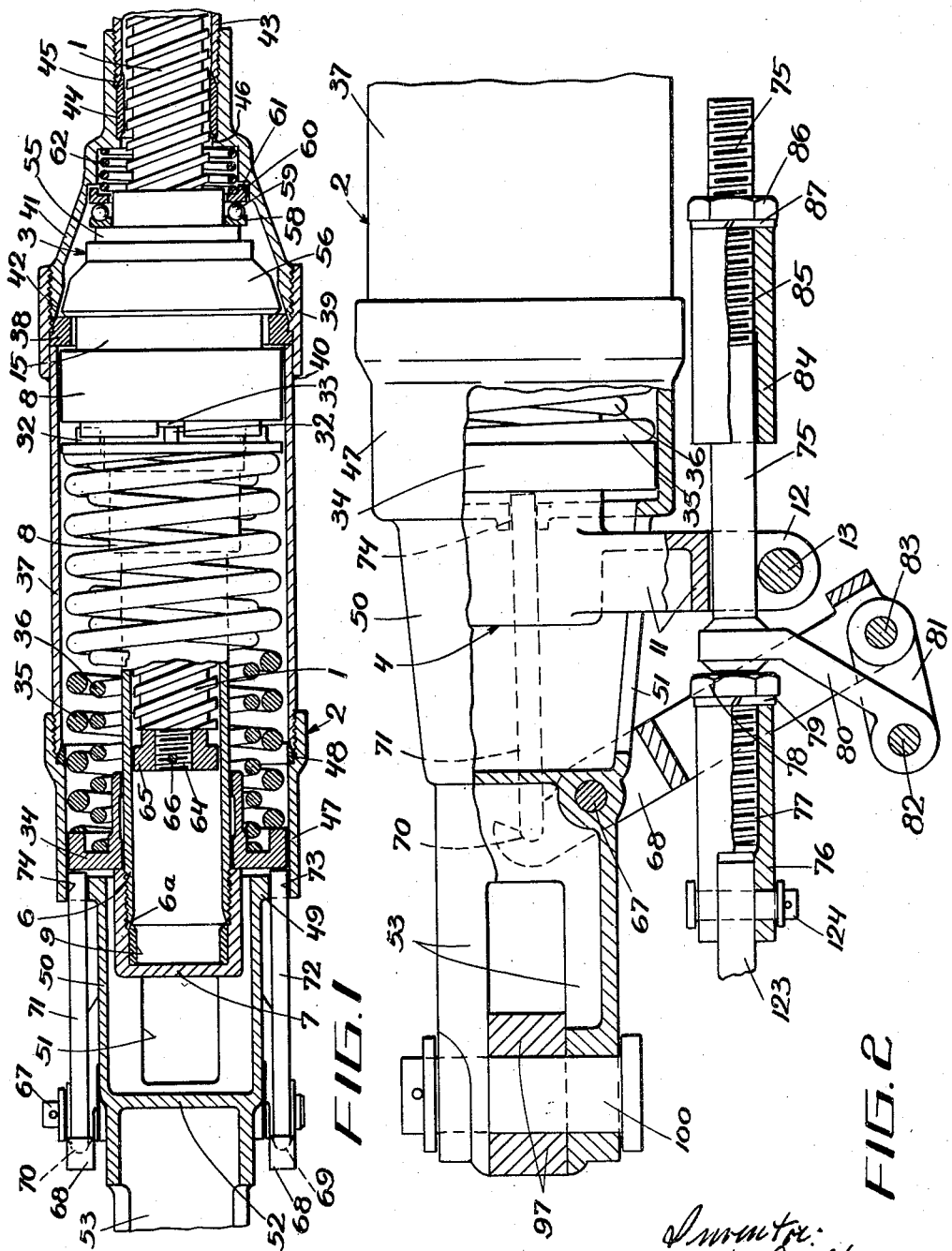

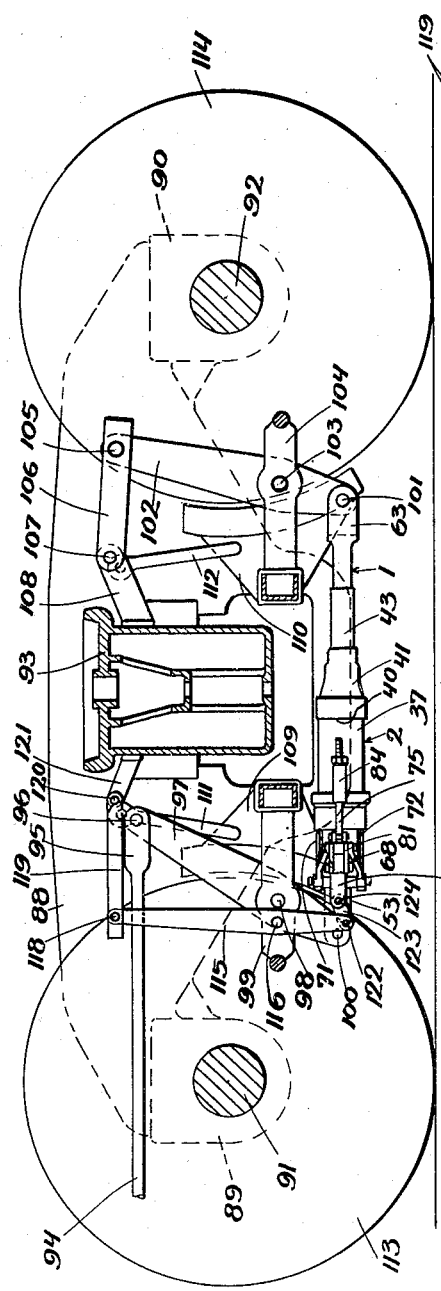

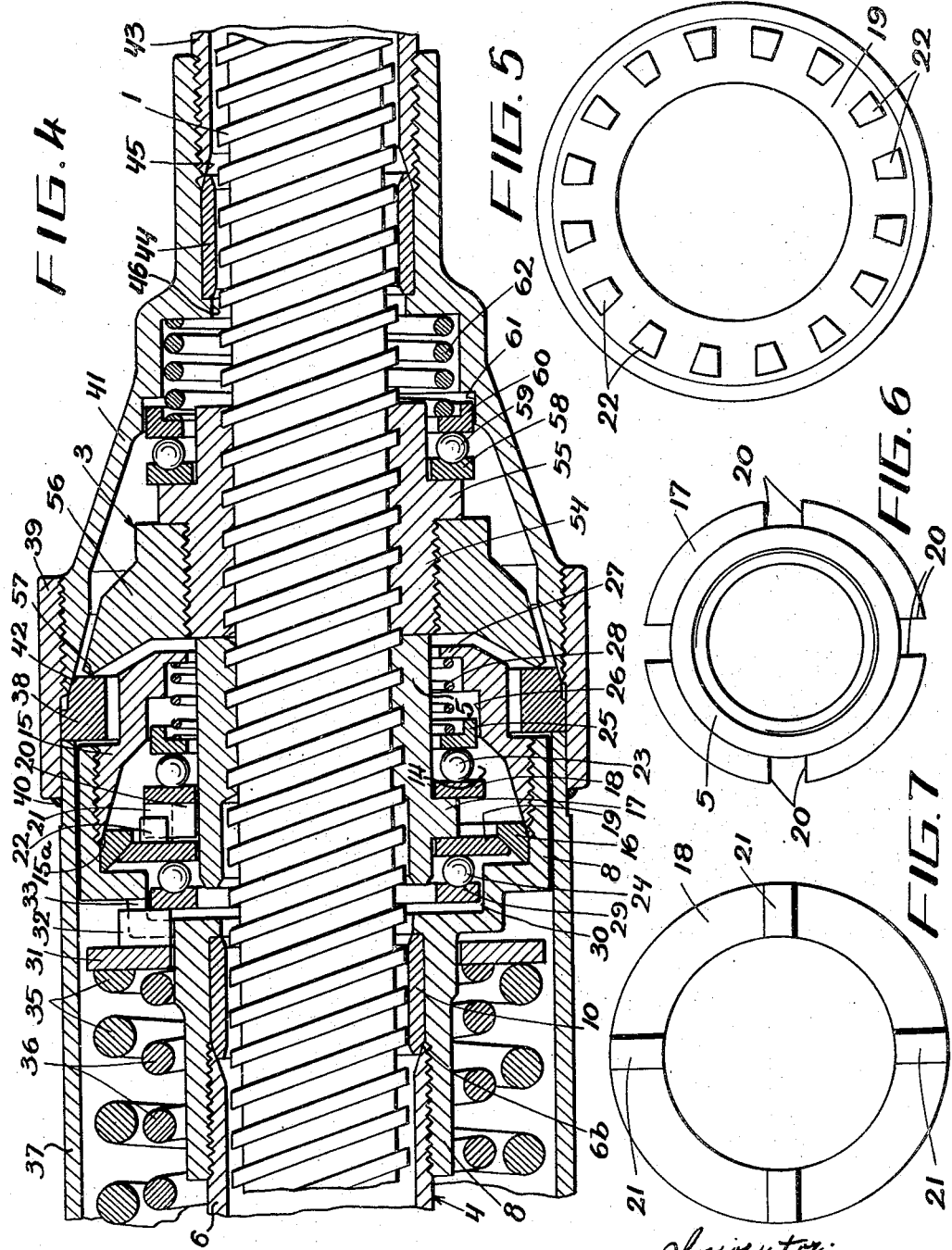

2,497,343

UNITED STATES PATENT OFFICE 2,497,343

AUTOMATIC SLACK ADJUSTER FOR BRAKES

Axel Georg Hjalmar Carlbom, Malmo, Sweden, assignor to Svenska Aktiebolaget Bromsregulator, Malmo, Sweden, a corporation of Sweden Application December 4, 1945, Serial No. 632,720

8 Claims. (Cl. 188—202)

This invention relates to automatic slack adjusters for brakes and more particularly to automatic slack adjusters of the kind comprising a two-part brake rod one part of which is in the form of a screw-spindle having screw-threads of such a pitch as to make it non-self-locking, an operating member movable axially in relation to the other rod part and adapted to be moved in relation thereto in one direction during application and in the other direction during release of the brake, a first nut screwed on the screw-spindle for coupling it to said other rod part during application of the brake, and a second nut screwed on the screw-spindle for coupling it to the operating member during release of the brake.

Hereinafter, for the purpose of identification, said first and second nuts will be called the coupling nut and the adjusting nut, respectively, and said other brake rod part which is usually tubular will be called the tubular rod.

In automatic slack adjusters of the kind herein referred to, the adjusting nut has to be easily movable on the screw-spindle in one direction (during application of the brake), whereas it must be relatively heavy to move on the screw-spindle by the operating member in the other direction in which latter the operating member moves in relation to the tubular rod during release of the brake, so that a certain axial force has to be exerted on the adjusting nut for moving it on the screw-spindle in this direction. As may be gathered from the U. S. Patent No. 2,225,001 to Bert Henry Browall and from his pending U. S. Patent application Ser. No. 431,173, filed February 16, 1942, now Patent No. 2,312,384, granted March 2, 1943, it has already been proposed to provide a spring-pressed slip friction clutch between the adjusting nut and the operating member for determining the axial force which the operating member will have to exert on the adjusting nut for moving it on the screw-spindle during release of the brake. In case also the axial force exerted on the adjusting nut by the operating member during release of the brake depends on a spring (such as the spring 6 in the U. S. Patent No. 2,225,001), the separate spring which according to the aforesaid prior proposal is used for compressing the slip friction clutch must necessarily be of such a selected power as will limit the force required for moving the adjusting nut on the screw-spindle to a value satisfactorily less than the force which the operating member under the urgency of its spring is able to exert on the adjusting nut; or rather the spring urging the operating member must be of such a selected power as is satisfactorily greater than the axial force required on the adjusting nut for moving it on the screw-spindle and determined by the power of the spring compressing the slip friction clutch provided between the adjusting nut and the operating member. Due to the practically unavoidable tolerance in the manufacture of the two separate springs mentioned, and further due to the practical necessity of making them exchangeable in the manner that any two springs out of two manufactured series may be paired together, there must necessarily be a relatively wide margin between them, the import of which is that the power of the spring of the operating member must necessarily be selected considerably in excess of the force required on the adjusting nut for moving it on the screw-spindle in the direction in which the operating member moves in relation to the tubular rod during release of the brake. During application of the brake, the power of the spring of the operating member acts as a resistance to, and thus subtracts from, the brake power, and for this reason any power of the spring of the operating member in excess of the force required on the adjusting nut for moving it on the screw-spindle during release of the brake is undesirable.

One object of the invention is to provide an automatic slack adjuster of the kind referred to, in which spring power is used for urging the operating member back into normal position during release of the brake, and in which the axial force required on the adjusting nut for moving it on the screw-spindle in the direction in which the operating member moves in relation to the tubular rod during release of the brake is controlled automatically by said spring power for the purpose of making the function of the slack adjuster practically insensible to changes in said spring power.

Another object of the invention is to provide an automatic slack adjuster of the kind referred to, in which a spring or springs used for returning the operating member into normal position during release of the brake, is or are utilized also for the purpose of compressing a slip friction clutch provided between the adjusting nut and the operating member for determining the axial force required on the adjusting nut for moving it on the screw-spindle in the direction of the returning movement of the operating member in relation to the tubular rod during release of the brake.

Still another object of the invention is to so combine said return spring or springs of the operating member and said slip friction clutch that the force required on the adjusting nut for moving it on the screw spindle in the direction of the movement of the operating member in relation to the tubular rod during release of the brake will be adapted or suited automatically to the power of said return spring or springs, whereby the necessary margin between the power of said return spring or springs and the said requisite force on the adjusting nut may be reduced to a minimum without hazarding the correct function of the slack adjuster.

These and further objects of the invention will be apparent from the following detailed description of a preferred embodiment of the invention illustrated by way of example on the accompanying drawings in which:

Fig. 1 is a longitudinal vertical section through the automatic slack adjuster,

Fig. 2 is a fractional plan view, partly in section, of the slack adjuster, drawn on a larger scale than Fig. 1.

Fig. 3 is a corresponding end view, partly in section, of the slack adjuster,

Fig. 4 is a fractional longitudinal section through the slack adjuster, drawn on a larger scale than Figs. 2 and 3, Fig. 5 is an end view of a detail as viewed from the right in Fig. 4, Fig. 6 is an end view of another detail as viewed from the left in Fig. 4, Fig. 7 is an end view of still another detail as viewed from the left in Fig. 4, Fig. 8 is a diagrammatic longitudinal horizontal section through a bogie or truck for a railway car and illustrates, by way of example, one form of a brake rigging and the mounting of the slack adjuster therein, and Fig. 9 is an end view, partly in section, of the mounting of the slack adjuster, drawn on a larger scale than Fig. 8.

In the drawings the invention is illustrated in a constructional form devised for a conventional type of bogies or trucks for American railway freight cars. In this form the slack adjuster comprises a two-part brake push rod, but the invention is also applicable in cases where the slack adjuster comprises a two-part brake pull rod.

In the form shown on the drawings the automatic slack adjuster comprises a two-part brake push rod one part of which is in the form of a non-rotatable screw-spindle 1 having screw-threads of such a pitch as to make it non-self-locking, whereas the other brake rod part is in the form of a non-rotatable tubular rod 2. The screw-spindle 1 is axially slidable in the tubular rod 2 under the control of a coupling nut 3 screwed on the screw-spindle 1 for coupling it to the tubular rod 2 (so as to enable the two-part brake push rod formed by the screw-spindle 1 and the tubular rod 2 to transmit brake power during application of the brake), an operating member 4 movable axially in relation to the tubular rod 2 and adapted to be moved in relation thereto in one direction during application and in the other direction during release of the brake, and an adjusting nut 5 screwed on the screw-spindle 1 for coupling it to the operating member 4 during release of the brake. The adjusting nut 5 is easily movable on the screw-spindle 1 in one direction (during application of the brake), but must necessarily be relatively heavy to move on the screw-spindle 1 in the other direction, that is the direction in which the adjusting nut 5 is moved by the operating member 4 during release of the brake. Thus a certain force has to be exerted on the adjusting nut 5 for moving it on the screw spindle 1 in the last mentioned direction.

The operating member 4 comprises a tube 6 having screwed onto its opposite ends two sleeves 7 and 8, respectively. The tube 6 is provided internally at its ends with conical seats 6a and 6b for coaction with external conical surfaces on rings 9 and 10, respectively, which are inserted in the sleeves 7 and 8, respectively, and which, when the sleeves 7 and 8 are screwed home on the ends of the tube 6, expand the tube ends into firm contact with the internal screw-threads of the sleeves 7, 8 and thus frictionally lock the sleeves 7, 8 to the tube ends. The sleeve 7 is provided with an arm 11 ending in a fork 12 provided with a transverse bolt 13. The sleeve 8 has an enlarged end portion forming a chamber 14 housing the adjusting nut 5. The chamber 14 is provided with an end wall in the form of a ring 15 which is screwed into the sleeve 8 and provided internally at its inner end with a conical seat 15a for coaction with an external conical surface on a ring 16 which is inserted in the sleeve 8, so that, when screwing home the ring 15, the ring 16 will expand the inner end of the ring 15 into firm contact with the internal screw threads for the same on the sleeve 8 and thus frictionally lock the ring 15 in place.

On either side of a flange 17 on the adjusting nut 5 there are two rings 18 and 19, both of which are easily movable axially on the adjusting nut, and both of which are of a greater outer diameter than the flange 17. In the flange 17 there are a number of recesses 20, and the ring 18 is provided with a corresponding number of axial projections 21 engaging into said recesses 20. The axial length of the projections 21 is only slightly less than the axial dimension of the flange 17, but the radial dimension of the projections 21 is greater than the radial height of the flange 17. Also the ring 19 is provided with a (preferably greater) number of axial projections 22, which, however, are situated radially beyond the outer periphery of the flange 17. The spaces between the projections 22 are sufficiently wide to permit the projections 21 to engage into them, and the axial length of the projections 22 is less than that of the projections 21.

The sides of the rings 18, 19 remote from those provided with the projections 21 and 22, respectively, are ground to serve each as one of the races for the balls of two antifriction thrust ball bearings 23 and 24, respectively. The other race for the balls of the antifriction thrust bearing 23 is on a ring 25 guided in a recess 26 in the ring 15. Between the ring 25 and a flange 27 on the ring 15 there is inserted a compression spring 28 which by means of the antifriction thrust bearing 23 normally holds the ring 18 in contact with the flange 17 and under a relatively light pressure. The other race for the balls of the antifriction thrust bearing 24 is on a ring 29 guided in a recess 30 in the sleeve 8 and acted upon by means of a ring 31 axially movable on the sleeve 8 and provided with axial projections 32 projecting into contact with the ring 29 through apertures 33 in the sleeve 8. Between the ring 31 and a collar 34 slidably mounted on the tube 6 at the other end thereof (adjacent the sleeve 7) there are inserted two compression springs 35, 36 urging the ring 31 and the collar 34 in opposite directions (away from each other) with relatively great force. By this spring force, transmitted by the ring 31, the projections 32, the ring 29 and the antifriction thrust bearing 24 to the ring 19, the latter is pressed firmly against the locking ring 16, the coacting surfaces of the two rings 16 and 19 preferably being of a conical shape, as shown. To be exact, the force pressing the ring 19 against the locking ring 16 equals the force of the two springs 35, 36 less the counteracting force of the weak spring 28, which, however, is so small that it can be disregarded in this connection. By the force of the springs 35, 36 at the other ends thereof the collar 34 is pressed against the sleeve 7 screwed on the end of the tube 6, and as long as the collar 34 abuts the sleeve 7 the force of the two springs 35, 36 is confined within the operating member 4 and has no tendency to move it in either direction. Preferably the two compression springs 35, 36 are coiled in opposite directions so that they cannot possibly get entangled with each other's coils.

The tubular rod 2 has an intermediate portion in the form of a tube 37 encasing the two springs 35, 36 and the sleeve 8 and extending beyond the latter. Thrusting against the end of the tube 37 beyond the sleeve 8 there is a locking ring 38 held in place by a socket 39 fitted onto the end of the tube 37 and welded thereto at 40. The socket 39 extends beyond the locking ring 38, and in an internally screw-threaded portion of the socket 39 outside of the locking ring 38 there is screwed a tapering end socket 41 locked in place by the coaction of an internal conical surface 42 on the socket 41 with a corresponding external conical surface on the locking ring 38. In the narrow outer end of the tapering end socket 41 there is screwed a protecting tube 43 which covers the part of the screw-spindle 1 extending beyond the end socket 41, and which thus protects this part of the screw-spindle 1 against injury and dirt. Also the locking of the tube 43 to the end socket 41 is effected by means of a locking ring 44 and an internal conical surface 45 on the tube 43 for coaction with a corresponding external conical surface on the locking ring 44. When the tube 43 is screwed home, the ring 44 is clamped between the tube 43 and a flange 46 in the end socket 41. The ring 44 may serve at the same time to guide the screw-spindle 1 in relation to the end socket 41, similarly as the ring 10 may also serve to guide the screw-spindle 1 in relation to the sleeve 8 of the operating member 4.

Screwed onto the other end of the tube 37 is a socket 47 locked in place by means of a locking ring 48 with an external conical surface coacting with a corresponding internal conical surface on the tube 37. The inside of the socket 47 serves as a guide for the slidable collar 34. Beyond the collar 34 the socket 47 has an end wall 49 merging into a casing 50 encasing the sleeve 7 of the operating member 4 and provided with a longitudinal slot 51 through which the arm 11 on the sleeve 7 projects. The casing 50 is closed by an end wall 52 beyond which it merges into a jaw 53 for connecting the tubular rod 2 to a brake lever from which the tubular rod 2, during the braking operation, receives brake power in the form of a pushing force which will be transmitted by the parts 50, 49, 47, 37 to the locking ring 38, and further by the coupling nut 3 to the screw-spindle 1.

The coupling nut 3 is housed in the end socket 41 and comprises an internally screw-threaded sleeve 54 having a flange 55, and a thrust ring 56 screwed onto the sleeve 54 against the inner side of the flange 55. Preferably the sleeve 54 is made of a material, such as cast iron, having good sliding qualities, whereas the thrust ring 56 (as well as the locking ring 38) preferably is made of a hard material, for instance hardened steel. The thrust ring 56 has an edge 57 for contact with the locking ring 38. On the outer side of the flange 55 there is an antifriction thrust bearing comprising a ring 58 on the sleeve 54, a series of balls 59 and a second ring 60 which is axially movable to some extent in relation to the end socket 41 and guided in a recess 61 therein. The ring 60 is urged by a spring 62 in the direction towards the flange 55, so that this spring 62 normally holds the coupling nut 3 with its edge 57 in contact with the locking ring 38. Thus the aforesaid pushing force exerted on the tubular rod 2 during braking will be transmitted to the coupling nut 3 in the form of an axial pressure of the locking ring 38 on the contacting edge 57 of the coupling nut 3. The friction arising between the locking ring 38 and the coupling nut 3 due to this pressure will prevent rotation of the coupling nut 3 on the screw-spindle under the action of the torque to which the coupling nut 3 will be subjected as a result of said axial pressure on the same and the non-self-locking character of the screw-threads of the screw-spindle 1. Thus the screw-spindle 1 will be coupled to the tubular rod 2 so as to partake in any movement thereof under the action of the aforesaid pushing force thereon.

The outer end of the screw-spindle 1 projecting from the guard tube 43 is provided with a jaw 63 (Fig. 8) for coupling it to a second brake lever which is to receive braking force from the first mentioned brake lever through the two-part brake push rod 1, 2. At its inner end the screw-spindle 1 is provided with a screw-threaded reduced end portion 64 and a nut 65 which is screwed onto this end portion and locked thereon by a pin 66, and which serves as a stop coacting with the adjusting nut 5 to prevent the screw-spindle 1 from being pulled out from the tubular rod 2 unintentionally.

Pivoted on a bolt 67 extending through a transverse bore in the base of the jaw 53 at one side thereof is a fork-shaped lever 68. The free ends of the two shanks of this lever 68 are located above and below the casing 50 appertaining to the tubular rod 2, respectively, where they are provided with cup-shaped seats 69, 70 for the one ends of two push pins 71, 72, respectively, the other ends of which project through bores 73, 74, respectively, in the wall 49 and normally leave a small distance between them and the collar 34. Extending through the fork 12 of the arm 11 and held in place relatively thereto by the bolt 13 is a rod 75 provided in one end with a jaw 76 which preferably is adjustably screwed onto the rod 75, as shown at 77, and locked thereto in adjusted position by means of a locking nut 78 and a spring washer 79. Welded to the rod 75 behind the jaw 76 is an arm 80 connected to the lever 68 by means of a pair of links 81 and two bolts 82 and 83. The rod 75 is provided on its other end with an abutment 84 which similarly to the jaw 76 is adjustably screwed onto the rod 75, as shown at 85, and locked thereto in adjusted position by means of a locking nut 86 and a spring washer 87. Thus the distance between the abutment 84 and the fork 12 of the arm 11 in normal position may be adjusted to any desired value.

Figs. 8 and 9 illustrate an example of the mounting of the slack adjuster now described in a conventional type of brake rigging for a conventional type of bogie or truck for American railway freight cars. The bogie or truck comprises two side frames 88 each provided with two journal-boxes 89, 90 for the two wheel axles 91, 92, respectively, and a bolster 93 reposing on springs (not shown) in the side frames 88 and serving to support a car body.

From a central source of brake power on the car, not illustrated on the drawings, the brake power is transmitted to the bogie or truck by means of a main brake pull rod 94 having a jaw 95 connected by a bolt 96 to the upper end of a truck live brake lever 97 which by means of a bolt 98 is connected to a brake beam 99. Connected to the lower end of the live brake lever 97 by means of a bolt 100 is the jaw 53 of the tubular rod 2 of the slack adjuster. The jaw 63 of the screw-spindle 1 of the slack adjuster is connected by means of a bolt 101 to a truck dead brake lever 102 connected by means of a bolt 103 to a brake beam 104. The upper end of the dead brake lever 102 is connected by means of a bolt 105 to a link 106 which in turn is connected by means of a bolt 107 to a bracket 108 on the bolster 93. On the brake beams 99, 104 are the brake shoes 109, 110 which are suspended by break hangers 111, 112 and which are pressed against the wheels 113, 114 when the brakes are applied.

For the actuation of the operating member 4 of the slack adjuster there is provided an actuating lever 115 pivoted on a projecting pin 116 on the brake beam 99 and held in place thereon by a nut 117 (Fig. 9). The upper end of the lever 115 is connected by means of a bolt 118 to a link 119 connected by means of a bolt 120 to a bracket 121 on the bolster 93. Connected to the lower end of the lever 115 by means of a bolt 122 is a link 123 to which the jaw 76 of the actuating rod 75 is connected by means of a bolt 124. The ratio between the arms of the actuating lever 115 is the same as that between the arms of the live brake lever 97, and preferably the lengths of the arms of the actuating lever 115 are equal to those of the live brake lever 97.

The operation is as follows. At released brake, the bolt 96 is in its normal position shown in Fig. 8, and the bolt 118 always is held in the position shown in Fig. 8 by the link 119 connected to the fixed bracket 121. As the bolt 98 and the pin 116 are both situated on the brake beam 99 and the distance between them thus is fixed, the bolt 122 will also be held in such a position that the actuating rod 75 will take a fully determined normal position in relation to the tubular rod 2, which position is the one shown on the drawings. In the thus determined normal position of the lever 68 the latter permits the push pins 71, 72 to take a position in which they leave the collar 34 free to thrust against the end of the sleeve 7, and further leave a small distance between them and the collar 34, so that the force of the springs 35, 36 will be confined within the operating member 4, and so that the operating member 4 may move the said small distance to the left in Fig. 1, so that a corresponding distance may be obtained between the adjusting nut 5 and the sleeve 54 of the coupling nut 3. Thus the coupling nut 3 is free to thrust with its edge 57 against the locking ring 38, and if the slack adjuster, when in this position, should be subjected to a compressive force, this force will increase the pressure between the locking ring 38 and the edge 57 and thereby prevent rotation of the coupling nut 3 on the screw-spindle 1. The import of this is that the slack adjuster will be locked when in normal position at released brake.

When a braking operation is started, the bolt 96 moves to the left in Fig. 8, which results in such a relative movement of the bolts 100 and 122 that the actuating rod 75 will be pulled to the left in Figs. 2 and 8 in relation to the two-part brake push rod 1, 2. Though it is to be observed that when braking both the actuating rod 75 and the two-part brake rod 1, 2 will be moved, namely in opposite directions, the relative movement between them is more easily understood when looked on as if the two-part brake rod 1, 2 were at rest, and as if the actuating rod 75 were moving to the left in Figs. 2 and 8.

When the actuating rod 75 is in normal position at released brake, the actuating arm 68 is in the above described position shown in Figs. 2 and 8, in which the abutment 84 and the arm 11 are at a certain distance from each other, corresponding to the desired value to which the slack adjuster is to adjust the brake shoe clearances at released brake. During an application movement of the brake the actuating arm 68 is turned in the clockwise direction in Figs. 2 and 8, so that the push pins 71, 72 will be pushed to the right and will push the operating member 4 to the right until the sleeve 8 abuts the rear side of the locking ring 38 (compare also Figs. 1 and 4). During this movement the adjusting nut 5 will also have been moved with its right end into contact with the coupling nut 3 and will have pushed the latter somewhat to the right and thereby relieved the edge 57 from its contact with the locking ring 38. In this position of the parts, the force of the spring 62 will be transmitted by the intermediary of the ball bearing 58 and the coupling nut 3 to the adjusting nut 5, thus adding itself to the force of the spring 28 for diminishing the force pressing the ring 19 against the locking ring 16. It is to be noted, however, that the pressure of the ring 19 against the locking ring 16 is not materially affected by the springs 28 and 62, as both these springs are weak in comparison with the springs 35, 36. During the continued application movement of the brake after the operating member 4 cannot be pushed any further to the right, the push pins 71, 72 (see Figs. 1 and 2) will push the collar 34 slowly away from the sleeve 7 during compression of the springs 35, 36.

Should the two-part brake rod 1, 2 during this period be subjected to a compressive force tending to push the screw-spindle 1 to the left (as viewed in the drawings) in relation to the tubular rod 2, this force will tend to push, by the intermediary of the adjusting nut 5, the slip friction clutch ring 19 away from the friction ring 16 against which the slip friction clutch ring 19 is pressed by the force of the springs 35, 36 less the force of the springs 28 and 62. Should the compressive force on the two-part brake push rod 1, 2 rise to a value approximating that of the force pressing ring 19 against ring 16, the frictional engagement between the two rings 16 and 19 will loosen sufficiently for permitting the adjusting nut 5 to rotate on the antifriction thrust ball bearing 24 under the action of the torque resulting from the pushing force of the screw-spindle 1 and the non-self-locking character of the screw-threads thereof. Thus the screw-spindle 1 will be pushed to the left in relation to the tubular rod 2 (as viewed on the drawings), and during this relative movement of the two brake rod parts 1 and 2 the coupling nut 3 thrusts against the adjusting nut 5 and partakes in the rotation thereof.

Such a compressive force as aforesaid arises in the two-part brake rod 1, 2 during an application of the brake, if the brake shoe clearances at released brake are too small so that the brake shoes 109, 110 during the application of the brake will come into contact with the wheels before the bolt 96 has travelled the distance corresponding to the desired length of the brake application stroke. The result of the described relative movement of the two parts 1 and 2 of the two-part brake push rod is of course a shortening of the same, whereby the brake shoe clearances will be correspondingly enlarged when the brake is released again.

However, when the bolt 96 has travelled a certain distance during the application of the brake, the abutment 84 has reached the arm 11 and begins to move the latter and the operating member 4 to the left in relation to the tubular rod 2, as viewed in the drawings (the springs 35 and 36 thus being compressed also from the direction opposite to that from which they were compressed by the push pins 71, 72). The first result hereof is that the adjusting nut 5 will withdraw from the contact with the coupling nut 3 so that the latter will be free to seat with its edge 57 against the locking ring 38 and thereby block itself against rotation and thus couple the screw-spindle 1 to the tubular rod 2, whereby further movement of the screw-spindle 1 into the tubular rod 2 will be prevented. Thus the shortening of the two-part brake rod 1, 2 and the enlargement of the brake shoe clearances will be checked in a given position of the bolt 96 during the brake application movement, so that the brake application stroke attains its corresponding correct length.

During the continued brake application movement the increasing brake power will be transmitted from the truck live brake lever 97 (Fig. 8) by the jaw 53, the tubular rod 2 and the locking ring 38 to the coupling nut 3 and from the latter by the spindle 1 and its jaw 63 to the truck dead brake lever 102. Also after the brake shoes have been moved into contact with the wheels, the bolt 96 will continue its movement as far as permitted by the unavoidable elastic deformation of the parts of the brake rigging under the increasing braking stress, and the operating member 4 will be moved correspondingly further to the left as viewed in the drawings. But the adjusting nut 5 is not compelled to partake in this further movement of the operating member 4, in that the adjusting nut 5, to begin with, quietly remains in its position on the spindle 1 during said further movement of the operating member 4 including the rings 19 and 16 compressed by the springs 35, 36. Meanwhile, the projections 22 on the ring 19 move correspondingly to the left in relation to the engaging projections 21 on the ring 18, and the flange 27 approaches the ball bearing ring 25 and compresses the spring 28.

Obviously the same compressing of the spring 28 and the same movement of the projections 22 in relation to the engaging projections 21 will take place during each braking operation, even when the brake shoe clearances have their normal value.

At a braking operation, when the brake shoe clearances are too large, the brake shoes will not have reached into contact with the wheels when the abutment 84 reaches the arm 11, and thus the operating member 4 will have been moved correspondingly further to the left as viewed in the drawings, before the brake shoes are in contact with the wheels. During the beginning of the movement of the operating member to the left (in relation to the tubular rod 2), the spring 28 will be compressed and the projections 22 moved in relation to the engaging projections 21, and this time this movement will be sufficient for disengaging the projections 22 from the projections 21, and for bringing the bottom of the recess 26 in contact with the ball bearing ring 25. On the continued movement of the operating member 4 to the left, the adjusting nut 5 (which, as a result of the disengagement of the projections 22 and 21 from one another, is made free to rotate) will be pushed by the intermediary of the antifriction ball bearing 23 to the left on the screw-spindle 1 while rotating under the action of the torque depending on the non-self-locking character of the screw-threads of the screw-spindle 1.

When, during the release of the brake, the operating member 4 begins to move back to the right under the urgency of its return springs 35, 36, the adjusting nut 5 first remains in that position on the screw-spindle 1 to which it was moved during the preceding application of the brake, and the projections 22 are moved into engagement again with the projections 21. It is possible, and even probable, however, that the adjusting nut 5 during the application of the brake was moved to such an angular position on the screw-spindle 1 that the projections 22 cannot move in directly between the projections 21 but will abut the ends thereof. In such a case the ring 18 will be pushed to the right by the ends of the projections 22 abutting the ends of the projections 21, but as the projections 22 are of less axial length than the projections 21 the latter will not be moved fully out of their engagement in the recesses 20 in the flange 17 but will remain in this engagement with the adjusting nut 5.

When, during the continued return movement of the operating member 4 to the right, the ring 19 makes contact with the flange 17, part of the force of the compression springs 35, 36 (which until now with their whole force less relatively small force of the spring 28 have pressed the slip friction clutch ring 19 against the conical surface on the ring 16) will tend to move the adjusting nut 5, and the screw-spindle 1 resting therein, to the right. Due to the non-self-locking character of the screw-threads of the screw-spindle 1, the adjusting nut 5 has a tendency to rotate, and thus possibly a slipping may occur between the flange 17 of the adjusting nut 5 and the ring 19. However, such a slipping cannot continue for more than a fraction of a revolution, that is until those spaces between the projections 22 which were nearest to the projections 21, have been moved into register with the latter. At this moment the spring 28 pushes the ring 18 against the flange 17 so that the projections 22 will be engaged again with the projections 21 and lock the adjusting nut 5 against rotation in relation to the ring 19 which is held against rotation by its frictional contact with the ring 16. Thus the screw-spindle 1 will be compelled to partake in the further rightward movement of the adjusting nut 5.

If the brake rigging is highly elastic, it may happen that a certain braking stress remains between the jaws 53 and 63 of the two-part brake rod 1, 2 also after the operating member 4 has arrived at the above described position of its rightward return movement. Should this happen, obviously the screw-spindle 1 cannot be moved through the coupling nut 3 until the brake release movement has proceeded so far that the braking stress has ceased. During this period, the force of the return springs 35, 36 will be distributed by the intermediary of the ball bearing 24, on the contact surfaces of the ring 19 against the ring 16 and against the flange 17 in such a manner that the pressure of the ring 19 on the flange 17, and thereby the torque exerted on the adjusting nut by the non-selflocking screw-threads of the screw-spindle 1, will increase and simultaneously the pressure of the ring 19 against the ring 16 will decrease as the operating member 4 moves to the right. When this increasing torque becomes equal to and exceeds the decreasing braking torque depending on the friction between the coacting conical surfaces of the two members 19 and 16, this last-mentioned slip friction clutch slips and thus permits the adjusting nut 5 to rotate on the screw-spindle 1 (in which rotation the rings 18 and 19 partake), and thus to partake in the movement of the operating member 4 to the right. During the whole of this movement the adjusting nut 5 will exert on the screw-spindle 1 the same axial force as the ring 19 exerts on the flange 17. When finally the brake release movement has proceeded so far that the braking stress ceases, the axial force exerted on the screw-spindle 1 by the adjusting nut 5 will suffice for taking the screw-spindle 1 along in the movement of the adjusting nut 5 to the right, in that obviously the rotation of the adjusting nut 5 on the screw-sprindle 1 and the slipping between the two rings 16 and 19 of the slip friction clutch ceases at this moment.

Thus during the entire rest of the return movement of the operating member 4 to the right (which rest answers to the amount by which the brake shoe clearances exceeded their normal value at the application of the brake), the screw-spindle 1 will be moved to the right, and meanwhile the coupling nut 3 will rotate on the ball bearing 59 offering to this movement only the small resistance retermined by the tendency of the relatively weak spring 62 to keep the edge 57 on the thrust ring 56 in contact with the locking ring 38. When the operating member 4 has reached its normal or end position, the two-part brake push rod 1, 2 has been lengthened by the outward axial movement of the screw-spindle 1 in relation to the tubular rod 2, and to an extent corresponding to the amount by which the brake shoe clearances exceeded their normal value. During the continued brake clearance release movement, by which the abutment 84 is moved away from the arm 11, the two-part brake rod 1, 2 maintains its so adjusted length, so that at fully released brake the brake shoe clearances are restored to their desired normal value. That is to say that the brake will be correctly adjusted after one single application and release of the same.

As will be apparent from the above description, taken in connection with the drawings, the axial force required on the adjusting nut 5 for the displacement thereof on the screw spindle 1 by the return springs 35, 36 during the return movement of the operating member 4 on the release of the brakes, will be controlled automatically by the friction clutch 16, 19 due to the compression thereof by the return springs 35, 36. This controlling effect of the utilization of the return springs 35, 36 also for the compression of the slip friction clutch 16, 19 serves the purpose of automatically adapting or suiting the force required on the adjusting nut 5 for the displacement thereof on the screw spindle 1 during the return movement of the operating member 4 to the force available from the return springs 35, 36 for effecting this displacement of the adjusting nut, so that the correct function of the slack adjuster will be practically insensible to fluctuations or changes in the power of the return springs 35, 36. As a result hereof the necessary margin between the power of the return springs 35, 36 and the axial force required on the adjusting nut 5 for moving it on the screw spindle 1 during the return movement of the operating member 4 can be kept small without hazarding the desired ableness of the return springs 35, 36 to effect a displacement of the adjusting nut 5 on the screw spindle 1. The force which during the return movement of the operating member 4 is transmitted as a pushing force onto the spindle 1 by the adjusting nut 5, may be called the "adjusting force" of the slack adjuster and may be varied to suit different demands by varying the construction (chiefly the diameter and the conicity of the coacting friction surfaces) of the slip friction clutch 16, 19.

What I claim and desire to secure by Letters Patent is:

1. In an automatic slack adjuster for brakes of the character described, the combination comprising a two-part brake rod one part of which is in the form of a tubular rod and the other part of which is in the form of a non-self-locking screw-spindle axially movable in the tubular rod, and means for controlling the relative movements of the screw-spindle and the tubular rod, comprising a coupling nut screwed on the screw-spindle and housed in the tubular rod for coupling the screw-spindle to the tubular rod during application of the brake, a tubular operating member housed in the tubular rod and adapted to be moved axially in relation thereto in one direction during application of the brake, spring means for returning the operating member in the other direction in relation to the tubular rod during release of the brake, actuating means for compressing said return spring means during application of the brake, an adjusting nut screwed on the screw-spindle and housed in the tubular operating member for coupling the screw-spindle to the tubular operating member during release of the brake, and a slip friction clutch provided between the adjusting nut and the tubular operating member and compressed by said return spring means for controlling the axial force required on the adjusting nut for moving it on the screw spindle by said return spring means during the return movement of the operating member.

2. In an automatic slack adjuster as claimed in claim 1, the additional feature that the slip friction clutch provided between the adjusting nut and the operating member comprises a friction ring disengageably coupled to the adjusting nut and coacting both with a thrust surface on the adjusting nut and a friction surface on the operating member and pressed against these surfaces by the return spring means by the intermediary of an antifriction thrust bearing.

3. In an automatic slack adjuster for brakes of the character described, the combination comprising a two-part brake push rod one part of which is in the form of a tubular rod having a jaw at one end and the other part of which is in the form of a non-selflocking screw-spindle movable axially in the tubular rod and projecting therefrom at the other end thereof, and means for controlling the relative movements of the screw-spindle and the tubular rod, comprising a coupling nut housed in the tubular rod at said other end thereof and screwed on the screw-spindle for coupling it to the tubular rod during application of the brake, a tubular operating member housed in the tubular rod and adapted to be moved axially in relation thereto in one direction during application of the brake, and to return into a normal position during release of the brake, a collar movable axially on the operating member and guided in the tubular rod near the jaw end thereof, an abutment on the operating member near one end thereof for limiting the axial movement of said collar in relation to the operating member in the direction towards the jaw end of the tubular rod, an adjusting nut screwed on the screw-spindle inside of the coupling nut and housed in the adjacent other end of the tubular operating member for coupling the screw-spindle to the operating member during release of the brake, a slip friction clutch provided between the adjusting nut and the operating member and comprising a clutch ring disengageably coupled to the adjusting nut and coacting with a thrust surface on the adjusting nut and with a friction surface on the operating member, a number of coiled compression springs disposed around the operating member and encased in the tubular rod and acting between said collar on the operating member and said clutch ring so as to urge the latter against said thrust and friction surfaces on the adjusting nut and the operating member, respectively, an antifriction thrust bearing disposed between said springs and said clutch ring, an abutment on the tubular rod for limiting the axial movement of the operating member in relation to the tubular rod in the direction towards the coupling nut, and actuating means for moving said collar on the operating member for compressing said springs during application of the brake, so that the operating member, during release of the brake, will return into the normal position under the urgency of said compressed springs and in the direction towards the coupling nut, while said clutch ring being pressed against said friction surface on the operating member by part of the force of said compressed springs.

4. In an automatic slack adjuster as claimed in claim 3, the additional feature that said actuating means comprises a fork-shaped lever straddling the tubular rod and pivoted thereto adjacent the jaw end thereof, axially movable push pins provided between this fork-shaped lever and the movable collar on the operating member and guided in bores in the tubular rod, and means operable by brake application movement for turning said lever for compressing the return springs of the operating member during application of the brake.

5. In an automatic slack adjuster as claimed in claim 3, the additional feature that said clutch ring is disengageably coupled to the adjusting nut by said clutch ring and a second spring-pressed ring being mounted slidably on the adjusting nut on either side of a recessed radial flange thereon, said second ring having axial projections engaged in the recesses of said radial flange and extended radially beyond the latter, and said clutch ring having axial projections disposed radially beyond the outer periphery of said flange for engagement with the radial extensions of the projections on said second ring.

6. In an automatic slack adjuster as claimed in claim 3, the additional feature that the inner end portion of the tubular operating member is enlarged to form a chamber for the adjusting nut and is guided in the tubular rod, and that the pressure of the return springs is transmitted onto the slip friction clutch ring on the adjusting nut by means of a ring slidably mounted on the operating member and provided with axial projections projecting into said chamber through apertures in a wall thereof, and said antifriction thrust bearing disposed between said projections and the slip friction clutch ring in said chamber.

7. In an automatic slack adjuster for brakes of the character described, the combination comprising a two-part brake rod one part of which is in the form of a non-self-locking screw-spindle an operating member movable axially in relation to the other rod part and adapted to be moved in relation thereto in one direction during application of the brake, return spring means for returning said operating member in the other direction in relation to said other rod part during release of the brake, a coupling nut screwed on the screw-spindle for coupling it to said other rod part during application of the brake, an adjusting nut screwed on the screw-spindle for coupling it to the operating member during release of the brake, and a spring-pressed slip friction clutch provided between the adjusting nut and the operating member and compressed by part of the force of said return spring means for automatically suiting the axial force required on the adjusting nut for moving it on the screw spindle by said return spring means during the return movement of the operating member to the actual power of said return spring means.

8. In an automatic slack adjuster for brakes of the character described, the combination comprising a two-part brake rod one part of which is in the form of a non-self-locking screw-spindle, an operating member movable axially in relation to the other rod part and adapted to be moved in relation thereto in one direction during application of the brake, return spring means for returning said operating member in the other direction in relation to said other rod part during release of the brake, a coupling-nut screwed on the screw-spindle for coupling it to said other rod part during application of the brake, an adjusting nut screwed on the screw-spindle for coupling it to the operating member during release of the brake, a slip friction clutch provided between the adjusting nut and the operating member, and means compressing said slip friction clutch by force derived from said return spring means for automatically adapting the axial force required on said adjusting nut for moving it on the screw spindle by said return spring means during the return movement of the operating member to the actual power of said return spring means.

AXEL GEORG HJALMAR CARLBOM.

REFERENCES CITED

The following references are of record in the file of this patent:

UNITED STATES PATENTS

| Number | Name | Date |
|---|---|---|
| 2,270,501 | Browall | Jan. 20, 1942 |
| 2,312,384 | Browall | Mar. 2, 1943 |